US008649044B2

(12) United States Patent
Giannetti et al.

(10) Patent No.: US 8,649,044 B2
(45) Date of Patent: Feb. 11, 2014

(54) COMPUTER PROCESSING OF DIFFERENCES BETWEEN PRINT JOB FILES

(75) Inventors: Fabio Giannetti, Los Gatos, CA (US); Shaun Henry, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 874 days.

(21) Appl. No.: 12/696,192

(22) Filed: Jan. 29, 2010

(65) Prior Publication Data

US 2011/0188069 A1  Aug. 4, 2011

(51) Int. Cl.
*G06F 3/12* (2006.01)
*H04N 1/46* (2006.01)

(52) U.S. Cl.
USPC ......... 358/1.15; 358/1.6; 358/1.19; 358/1.13; 358/1.16; 358/1.18; 358/405; 358/504; 715/274; 700/100; 700/102

(58) Field of Classification Search
None
See application file for complete search history.

(56) References Cited

U.S. PATENT DOCUMENTS

| 5,748,342 | A | * | 5/1998 | Usami | 358/500 |
| 6,509,974 | B1 | | 1/2003 | Hansen | |
| 6,619,868 | B2 | | 9/2003 | Ishida | |
| 6,864,993 | B1 | * | 3/2005 | Roberts et al. | 358/1.9 |
| 6,873,435 | B1 | * | 3/2005 | Tehranchi et al. | 358/1.9 |
| 7,139,097 | B2 | * | 11/2006 | Wu et al. | 358/1.9 |
| 7,225,220 | B2 | | 5/2007 | Gonzalez et al. | |
| 7,299,244 | B2 | | 11/2007 | Hertling et al. | |
| 7,315,404 | B2 | | 1/2008 | Kimura | |
| 7,321,440 | B2 | | 1/2008 | Kimura | |
| 7,502,137 | B2 | | 3/2009 | Morales et al. | |
| 7,620,569 | B2 | | 11/2009 | Chiarabini et al. | |
| 8,018,612 | B2 | * | 9/2011 | Matsushita et al. | 358/1.15 |
| 2002/0019786 | A1 | * | 2/2002 | Gonzalez et al. | 705/28 |
| 2002/0051171 | A1 | * | 5/2002 | Hama | 358/1.15 |
| 2002/0131070 | A1 | | 9/2002 | Housel et al. | |
| 2002/0140969 | A1 | | 10/2002 | Ishida | |
| 2004/0190039 | A1 | | 9/2004 | Lay et al. | |
| 2005/0030577 | A1 | * | 2/2005 | Wiechers | 358/1.15 |
| 2006/0044597 | A1 | | 3/2006 | Dumitrescu et al. | |
| 2006/0092442 | A1 | * | 5/2006 | Such et al. | 358/1.9 |
| 2006/0126106 | A1 | * | 6/2006 | Harrington | 358/1.15 |
| 2006/0244991 | A1 | * | 11/2006 | Tenger et al. | 358/1.15 |
| 2006/0285857 | A1 | | 12/2006 | Swift | |
| 2007/0046989 | A1 | | 3/2007 | Shima | |
| 2007/0164554 | A1 | | 7/2007 | Krone et al. | |
| 2007/0263237 | A1 | * | 11/2007 | Robinson | 358/1.9 |
| 2008/0178067 | A1 | * | 7/2008 | Lahman et al. | 715/200 |
| 2008/0204829 | A1 | * | 8/2008 | Harrington | 358/504 |
| 2012/0057176 | A1 | * | 3/2012 | Robinson | 358/1.9 |

* cited by examiner

*Primary Examiner* — Miya J Cato
(74) *Attorney, Agent, or Firm* — Arthur Ortega

(57) ABSTRACT

Processing print jobs on a computer which comprises generating a first print ready job file by a first print module based on an input print job file and generating a second print ready job file by a second print module based on the input print job file. The first print ready job file is compared to the second print ready job file, and if there is at least one difference between the first print ready job file and the second print ready job file, the input print job file is forwarded to a PSP (printer service provider) that is configured with the first print module or the second print ready job file is forwarded to a PSP that is configured with the second print module.

25 Claims, 4 Drawing Sheets

COMPUTER PROCESSING OF
DIFFERENCES BETWEEN PRINT JOB FILES

BACKGROUND

Publishers who desire to publish a document typically generate a print job representing requirements for printing the document and submit the print job to a print service provider which prints the print job. It is desirable to check for errors when the document is being printed.

BRIEF DESCRIPTION OF THE DRAWINGS

For a detailed description of exemplary embodiments, reference will now be made to the accompanying drawings in which.

DETAILED DESCRIPTION

As will be explained below in further detail, in some embodiments, disclosed is a computer for processing print jobs that includes print modules which receive print jobs and generate print ready job files based on the print jobs. The computer uses the print ready job files to alert the user of errors caused by changes in the print modules.

In some embodiments, the present application discloses a system that may provide automated job fulfillment error detection techniques for use between print shop customers, print job clearing houses and job fulfillment centers such as print shops. An input print job is processed on the system using a print module which generates a print ready job file. The input print job is then sent to the PSP for printing and publisher proofing. Once the proof is accepted by the customer, the overall job production path and settings are saved in the system together with the corresponding rendered job file. The system may also allow for future comparisons and potential error detection in a manual or automated manner.

In some embodiments, the system may help address at least two concerns. First, the system may automate and enforce the proofing across a network of print service providers (PSPs), thereby helping to prevent and avoid non-compliant results to be sent to customers. In other words, the system may provide for an automatic feedback loop with the customer and all of the PSP companies involved with printing and fulfilling a particular customer job. This aspect may allow the publisher to obtain a soft-proof of the input print job, passing through the same path as the PSP would use to produce the input print job and obtain a printed proof identifying all the settings established during printing. This aspect may ensure replication of the workflow and press settings at the time of printing the proof. Second, the system may provide feedback and potentially a test environment for the release of new print modules. This aspect may provide a testing environment for print module providers because it can use real customer cases and validate the introduction of a new print module against the printed material on a previous release of the print module.

Figure 1:
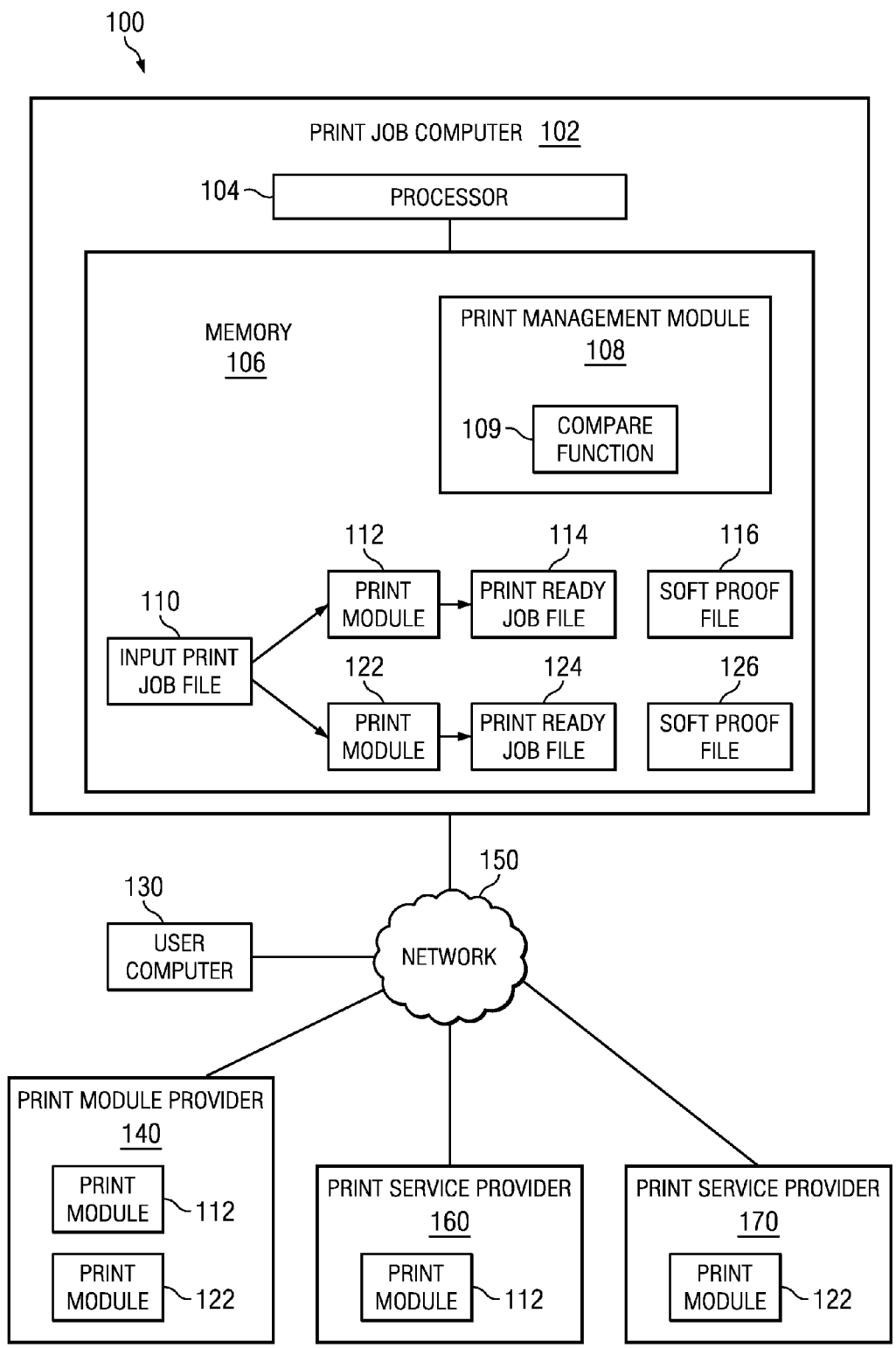
FIG. 1 shows a system for processing print jobs, constructed in accordance with at least some illustrative embodiments.

FIG. 1 shows an embodiment of a system 100 that includes a print job computer 102 which is coupled through a network 150 to user computer 130, print module provider 140, first print service provider (PSP) 160 and second PSP 170.

The print job computer 102 comprises processor 104 coupled to memory 106. The memory 106 includes instructions to be executed by processor 104 to control the operation of computer 102. In some embodiments, memory 106 comprises print management module 108 which includes software instructions configured with functionality for controlling the operation of the system including managing communication with PSP, print module providers and user computers over the network, and managing the input print jobs, print ready job files, and soft proof files.

The management module 108 communicates with user computer 130 over network 150. In one embodiment, a user submits an input print job file 110 using user computer 130. The file is received by print job computer 102 and stored in memory 106 for later use. The management module 108 may also interact with print module 112 and print module 122. For example, the user can request to have input print job file 110 processed or printed. The module 108 receives this request and responds to the request by retrieving input job file 110 and submitting it to print module 112 (or print module 122) which generates print ready file 114. The management module can also manage a user request for a soft proof file. For example, the module 108 receives the request for a soft proof file, retrieves input print job 110, generates soft proof file 116 and sends it to the user for review and approval via user computer 130 and over network 150. As explained in detail below, management module 108 includes compare function 109 which is configured to compare print ready files and check for differences that have been generated by two different print modules and make determinations regarding routing or forwarding the print ready job files to a particular PSP. The management module 108 also can route input print jobs and print ready job files to different PSPs based on user criteria such as cost or other criteria such as geographic proximity to the customer. In some embodiments, this routing can be performed automatically by the management module 108 or manually by providing a user the ability to select a particular input print job or print ready job file and route it to a particular PSP.

In one embodiment, the system 100 shows first print module 112 and second print module 122. However, it should be understood that more than two print modules can be employed in system 100. In some embodiments, a print module comprises software with workflow functionality that controls the scheduling processing and finishing of an input print job file. It is typically installed at a PSP site, but can also be installed "ahead" of the PSP and used to route jobs to various PSP. For example, in the embodiment shown in FIG. 1, print modules are installed in print job computer 102. The print module provider 140 sends the print modules to print job computer and managed by management module 108. In some embodiments, the print modules include one or more raster image processors (RIP) which generate a rasterized representation of the input print job. In some embodiments, the print modules include compression functionality for generating a compressed data representation of a print ready file. The print module provider 140 is a provider of print modules. In some embodiments, the print module provider can be the developer of print modules. In some embodiments, the print module provider sends print modules to print job computer and to PSPs. In some embodiments, the provider 140 can receive from computer 102 feedback information such as error information and performance information of the print modules.

In one embodiment, system 100 shows first print service provider (PSP) 160 and second PSP 170. However, it should be understood that more than two print service providers can be employed in system 100. In some embodiments, a PSP can provide printing services. In one embodiment, a PSP comprises a print shop with one or more printing press devices and one or more finishing devices. In some embodiments, the PSP is the location where the document is actually printed. However, this may not be where the document is shipped to the end user. In some embodiments, a PSP can receive print modules from a print module provider. The PSPs can use the print modules to generate print ready files for printing on a printing press device In one embodiment, system 100 shows a single input print job file 110. However, it should be understood that more than a single input print job file can be employed in system 100. The input print job file 110 comprises print objects of a print job and a description of how the print objects are to be processed including rendered on a printable area. In some embodiments, the input print job comprises an input page description language. In some embodiments, the page description language can comprise portable document format (PDF), extensible markup language (XML) paper specification (XPS), post script (PS), Word document or any other page description language type or format. In some embodiments, input print job 110 comprises input job definition format (JDF) information which describes how the job is to be processed or rendered. In some embodiments, the JDF is in XML format. In some embodiments, the JDF comprises information such as imposition, color profiles such as international color consortium (ICC) profiles, fonts, processing optimization commands, trapping configuration, color management configuration, copy count, duplexing, substrate/media settings (i.e. type, size, orientation, etc. . . . ), banner sheets, divider sheets, document finishing configuration and customer meta data. As explained above, management module 108 is responsible for managing input print job files including receiving input print jobs from user computer and sending input print jobs to a PSP.

In one embodiment, system 100 shows first print ready job file 114 and second print ready job file 124. However, it should be understood that more than two print ready job files can be employed in system 100. In some embodiments, a print ready job file comprises a rendered input print job which is ready to be sent for printing on, for example, a press, web printer, t-shirt printer or any device capable of printing the print file. In some embodiments, the print ready job file comprises rendered image information and JDF information. In some embodiments, the print ready job file comprises information which is relevant to the printing step in the workflow process. In some embodiments, the print ready job file comprises some or all of the data from the original JDF information. As explained above, print ready files are generated by print module and based on input print jobs. In some embodiments, the print ready job file can comprise compressed data representation of the rendered input print job.

In one embodiment, system 100 shows first soft proof 116 and second soft proof 126. However, it should be understood that more than two soft proof files can be employed in system 100. In some embodiments, a soft proof file comprises an electronic version of a viewable representation of the print ready file. The management module 108 is configured to retrieve the print ready file from memory and generate the soft proof file based on the print ready file.

A single user computer 130 is shown in system 100, but it should be understood that the system can employ a plurality of user computers. The user computer can be any electronic device capable of electronic communication over a network. The network 150 can be any means for allowing electronic communication between electronic devices. In some embodiments, the network can comprise wired or wireless communication means.

The processor 104 can be a general purpose microprocessor, microcontroller, digital signal processor, etc. configured to execute software programs or computer-executable instructions. The components of a processor are well known in the art and generally include execution units (e.g., integer, fixed point, floating point, etc.), instruction decoding, registers, memories, input/output ports, etc, interconnected by buses. The memory 106 can include various storage media, for example, magnetic storage (e.g., hard disks, floppy disks, tape, etc.), optical storage (e.g., compact disk, digital video disk, etc.), or semiconductor memory (e.g., static or dynamic random-access-memory ("SRAM" or "DRAM"), read-only-memory ("ROM"), FLASH memory, magnetic random access memory ("MRAM"), etc.). The system 100 includes software programming stored in memory 106 that when executed by processor 104 controls operations necessary for system 100.

Some embodiments of the system 100 can include an input/output subsystem which can comprise input devices, such as a keyboard, a mouse, etc. Embodiments can also include various input/output sub-systems to implement, for example, wired and/or wireless networking. In FIG. 1, the computer 102 is depicted as general purpose computer, however in practice computer 102 can be any of a variety of electronic devices. For example, computer 102 can be a telephone, personal digital assistant, music player, desktop computer, laptop computer, satellite navigation system, gaming system or other device.

Figure 2:
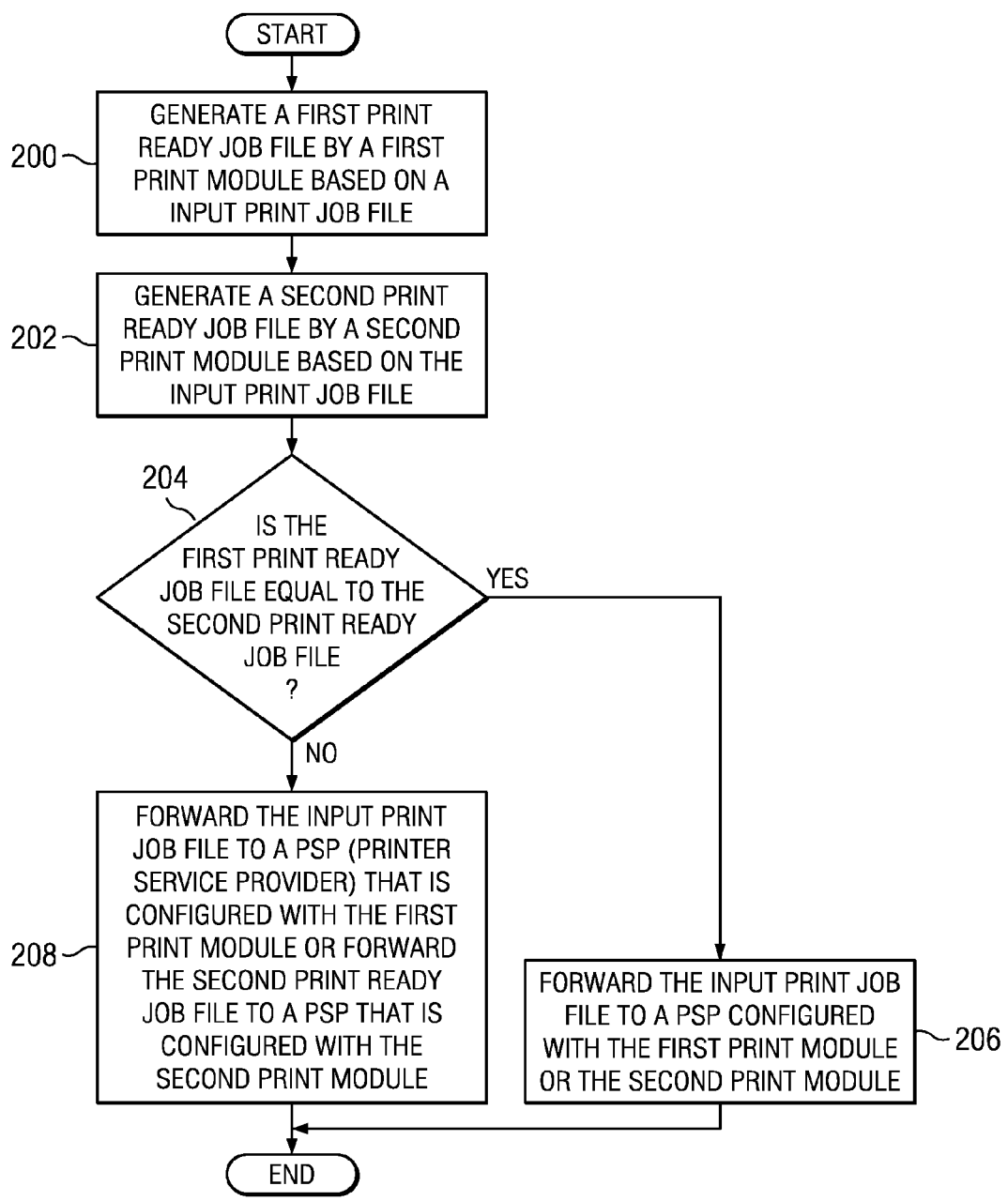
FIG. 2 is a flow chart showing a method of processing print jobs, constructed in accordance with at least some illustrative embodiments.

FIG. 2 shows a flow diagram of a method for processing print jobs in accordance with various embodiments. The method will be described with reference to system 100 shown in FIG. 1. It should be understood, that though depicted sequentially as a matter of convenience, at least some of the actions shown can be performed in a different order and/or performed in parallel. Additionally, some embodiments may perform only some of the actions shown. To illustrate, in one embodiment, it will be assumed that print module provider 140 has sent print module 112 to print job computer 102 and to PSP 160. At this point, print job module 112 represents the latest version of a print module. It will be further assumed that a user, such as a publisher, is interested in having a document published or printed. The publisher employs user computer 130 to submit print job file 110 which represents the document to be printed. The print job 110 is received by print job computer 102 through network 150.

At block 200, computer 102 uses print job module 112 to generate print ready job file 114 based on input print job file 110. In some embodiments, print management module 108 generates soft proof file 116 for review and approval by the publisher. In some embodiments, the soft proof is sent to the publisher via user computer 102 over network 150. If the publisher approves soft proof file 116, then print management module 108 sends input print job file 110 to PSP 160. The PSP 160, which is configured with print module 112, receives print job file 110 and generates a hard copy proof file based on the input job file. The PSP 160 sends the hard copy proof to the publisher for review. If the publisher approves the hard proof, then management module 108 stores print ready job file 114 in memory for subsequent use. In some embodiments, management module 108 may store metadata (i.e., data about the job) regarding print module 112 and settings along with print ready job file 114.

To further illustrate, in one embodiment, it will be further assumed that print module provider 140 has developed print module 122 which is a different version than print module 112. Print module provider 140 sends a copy of print module 122 to print job computer 102 and to PSP 170. As explained above, PSP 160 is configured with print module 112. It will be further assumed that a user, such as a customer, is interested in ordering a copy of print job 110 which, as explained above, was approved by the publisher. This idea of ordering may be referred to as on-demand printing or ordering a published document. At this point, management module 108 will retrieve print job 110 from memory and send it to print module 122 for print processing.

At block 202, computer 102 uses print job module 122 to generate print ready job file 124 based on input print job file 110. Print ready file 124 may be different than press ready file 112 previously generated. As explained below, computer 102 checks for differences between the two print ready files to detect errors caused by different version print modules. In some embodiments, print management module 108 generates soft proof 126 for review by the publisher. In some embodiments, the soft proof file is sent to the customer for approval via user computer 130 over network 150.

At block 204, computer 102 uses management module 108 to compare print ready job file 114 to print ready job file 124 to determine if there are differences between the two files. If there are no differences between the layout files, then processing proceeds to block 206. On the other hand, if there is at least one difference between the files, then processing proceeds to block 208. In some embodiments, the comparison can be performed in a multiple level manner. For example, a first level comparison can comprise comparing differences of the rendered objects in the print ready files. A second level comparison can comprise comparing differences between the compressed data in the print ready files.

Figure 3:
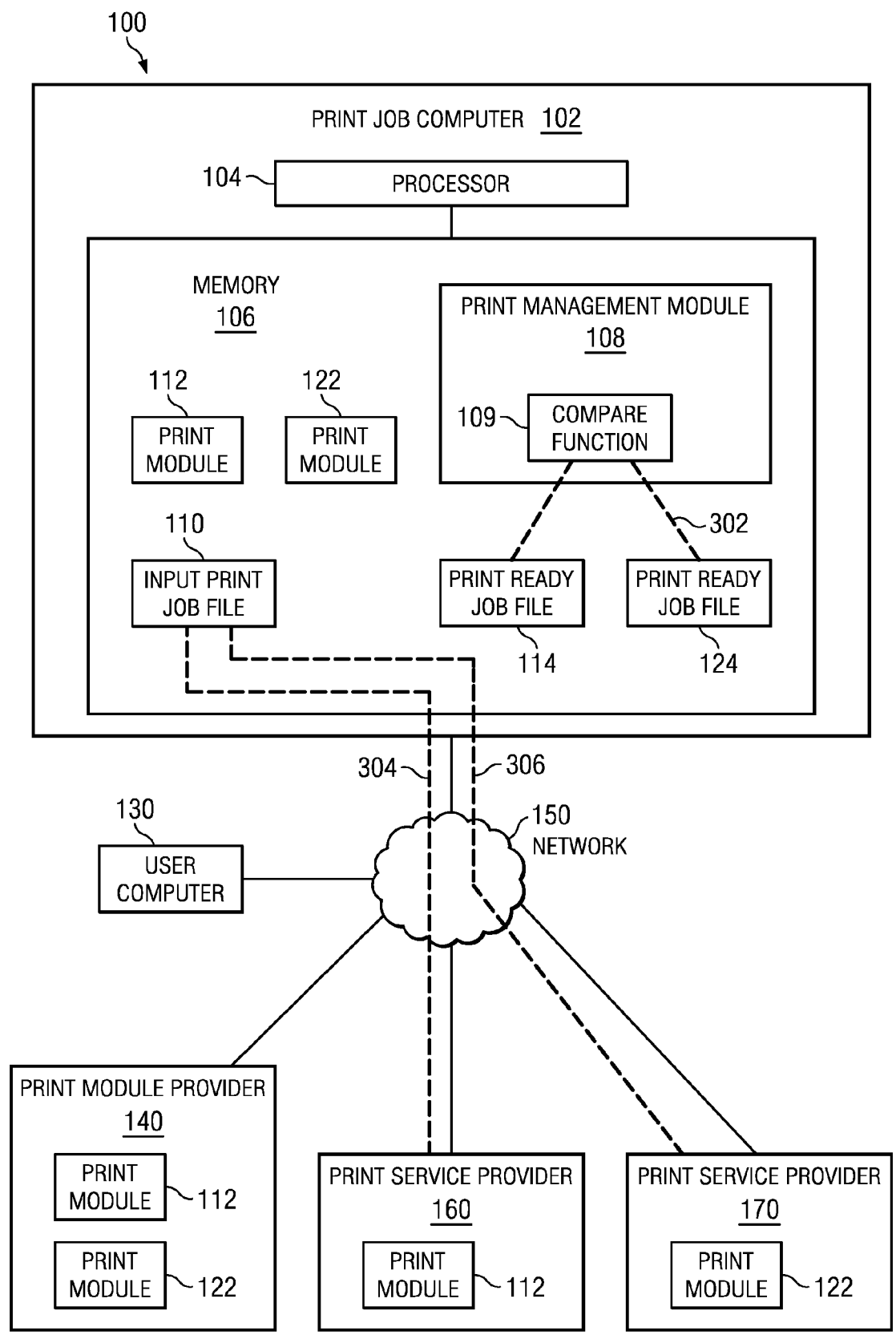
FIG. 3 shows the system of FIG. 1 routing print jobs to print service providers in accordance with at least some illustrative embodiments.

At block 206, because there is no difference between the print ready job files, management module can forward print job file 110 to a PSP configured with print module 112 or print module 122. Referring to FIG. 3, the management module 108 employs compare function 109 to compare the print ready jobs (shown by dashed line 302). In some embodiments, the comparison can be performed in a multiple level manner. For example, a first level comparison can comprise comparing differences of the rendered objects in the print ready files. A second level comparison can comprise comparing differences between the compressed data in the print ready files. In some embodiments, print job 110 is sent to PSP 160 which is configured with print module 112 (the original version module, shown by dashed line 304) or to PSP 170 which is configured with print module 122 (the new version, shown by dashed line 306). In some embodiments, the user, in this case, the customer may be provided with the ability to select a PSP that is configured with the proper print module and the ability make the decision based on other factors such as cost. In other words, the print job customer provides the user with the ability to select from among a network or plurality of PSPs to have the print job fulfilled or printed.

Figure 4:
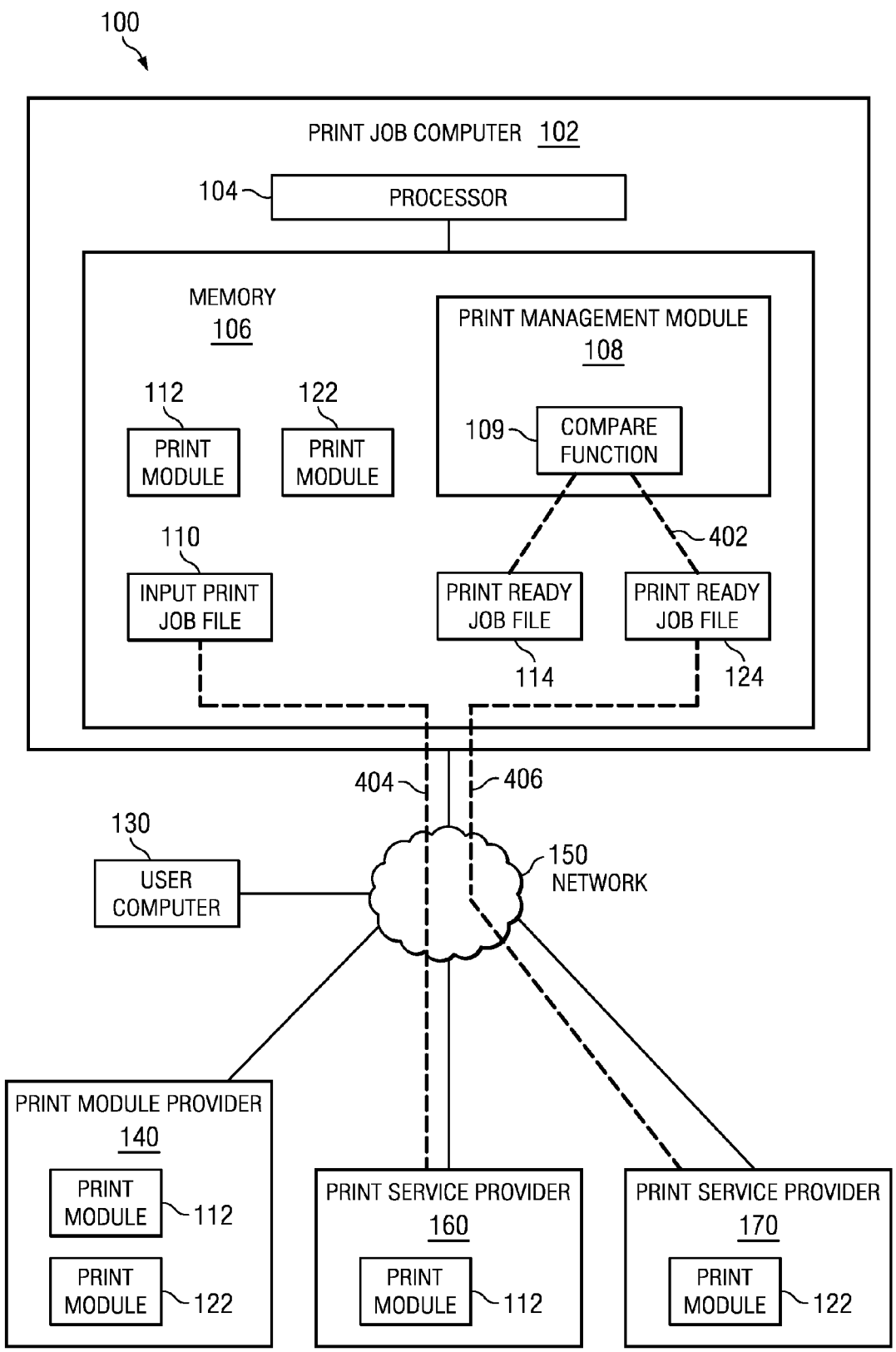
FIG. 4 shows the system of FIG. 1 routing print jobs to print service providers in accordance with at least some illustrative embodiments.

At block 208, the management module 108 has detected differences between the print ready job files. Referring to FIG. 4, the management module 108 employs compare function 109 to compare the print ready jobs (shown by dashed line 402). The management module 108 can forward input print job file 110 to a PSP that is configured with print module 112, for example, in one embodiment, PSP 160 (shown by dashed line 404). In one embodiment, management module 108 can forward print ready job file 124 to a PSP that is configured with the second print module, for example, PSP 170 (shown by dashed line 406). In some embodiments, the customer may be provided with the ability to select a PSP that is configured with the proper print module based on factors such as cost other criteria such as geographic proximity to the customer.

In some embodiments, once the management module 108 detects differences between the print ready job files, it can notify print module provider 140 of the differences. In some embodiments, management module 108 may send information regarding the differences regarding the print ready files potentially caused by a new version print module. In some embodiments, management module 108 can send to provider 140 a copy of input print job 110 and print ready job file 124. This may allow provider 140 to analyze the problem including testing and debugging the print module to determine the source of the problem and correct the problem.

In some embodiments, differences in the print ready file or the soft proof file may be generated if an input print job is printed using a new release print module. The system can route the input print job to a PSP that has either an older version of the print module or stream the print ready print job file to the PSP with newer print module to enforce the result compatibility with the original soft proof file. The input print job and the print ready job file and settings can be forwarded to the print module provider for debugging purposes allowing for an automated feedback loop between the PSP and the print module provider. This aspect may be beneficial for improving print module provider quality since the entire settings of the print workflow environment are captured making it easy to reproduce the issue. In some embodiments, the system allows a new release print module that is in preproduction stage (alpha or beta version) to be tested against the document present in the system to identify potential issues before the new version of the print module reaches the final release.

Some embodiments of the present application can exhibit various advantages. For example, the system can provide for an automated, feedback loop style proofing system for publishers by providing both soft and hard proofing that reflects the true printing process and settings.

In other embodiments, the system can provide an automated proofing enforcement and error detection mechanism which may help avoid inconsistencies for on demand printing applications. This may help reduce and potentially eliminate print results that are different from the original proof due to software and settings changes in the PSP. For example, once the workflow and settings have been generated and approved by a publisher, they can be replicated allowing the print ready file to be streamed to the PSP to enforce the approved original result.

In other embodiments, the system may provide a test bench for preproduction (e.g., alpha and beta) versions of new print module and press software. The available successfully proofed and printed documents can be matched against the results from the latest workflow deliverables. Moreover, the information about the settings can help in reproducing the conditions that may create issues.

In some embodiments, the system may provide a network of PSPs which may enable a designer to obtain the best price or service without being forced to use a specific PSP. In other words, the system implements a distributed service model. In contrast, in a conventional system, a designer who is preparing a print ready file would have to buy all the equipment and keep track of the changes, whereas the disclosed system removes this burden. In some embodiments, the system provides for input print job submission through the web which enables on-demand web-to-print environment.

The above discussion is meant to be illustrative of the principles and various embodiments of the present disclosure. Numerous variations and modifications will become apparent to those skilled in the art once the above disclosure is fully appreciated. For example although the illustrative embodiments of the present disclosure are shown and described within the context of a single computer, the functionality of the single computer could be distributed over a plurality of computers. It is intended that the following claims be interpreted to embrace all such variations and modifications.

As noted above, embodiments within the scope of the present disclosure may include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present disclosure, in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The present subject matter may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the present disclosure might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the present disclosure has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of processing print jobs on a computer, the method comprising:
    generating a first print ready job file by a first print module based on an input print job file stored in a memory;
    generating a second print ready job file by a second print module based on the input print job file;
    using a print management module having a compare function for automatically comparing differences of rendered objects between the first print ready job file and the second print ready job file; and
    if there is at least one difference between the first print ready job file and the second print ready job file, using the print management module for automatically forwarding the input print job file to a PSP (printer service provider) that is configured with the first print module or forwarding the second print ready job file to a PSP that is configured with the second print module, one of the first print module and the second print module selected to enforce result compatibility with an original soft proof file by automatic proof enforcement.

2. The method of claim 1 further comprising: If there is no difference, then forwarding the input print job file to a PSP configured with the first print module or the second print module.

3. The method of claim 1, further comprising: receiving the second print module from a provider; and notifying the provider of the difference.

4. The method of claim 1, further comprising: receiving the input print job file from a user over a network; generating a soft proof file of the input print job file; and sending the soft proof file to the user over the network.

5. The method of claim 1, wherein the input print job file comprises print objects of a print job and a description of how the print objects are to be processed.

6. The method of claim 1, wherein the first print ready job file comprises a rendered input print job which is ready to be sent for printing.

7. The method of claim 1, wherein the print module controls scheduling processing and finishing of an input print job.

8. The method of claim 1 further comprising: comparing differences, between the first print ready job file and the second print ready job file, in a multiple level manner.

9. The method of claim 8 further comprising: a first level comparison comparing differences of rendered objects in the first and second print ready job files, and a second level comparison comparing differences between compressed data in the first and second print ready job files.

10. The method of claim 1 further comprising: notifying a print module provider of the differences between the first print ready job file and the second print ready job file.

11. The method of claim 1 further comprising: sending a copy of the input print job file and the first and second print ready job files to a print module provider.

12. The method of claim 1 further comprising: providing the print module provider with a copy of the input print job file and the first and second print ready job files to test and debug the print module and determine a source of a problem to improve print module provider quality.

13. A computer configured for processing print jobs comprising:
a memory for storing software instructions; and
a processor coupled to the memory and configured to execute the software instructions for:
generating a first print ready job file by a first print odule based on an input print job file;
generating a second print ready job file by a second print module based on the input print job file;
using a print management module having a compare function for automatically comparing differences of rendered objects between the first print ready job file and the second print ready job file; and
if there is at least one difference between the first print ready job file and the second print ready job file, using the print management module for forwarding the input print job file to a PSP (printer service provider) that is configured with the first print module or forwarding the second print ready job file to a PSP that is configured with the second print module, one of the first print module and the second print module selected to enforce result compatibility with an original soft proof file by automatic proof enforcement.

14. The computer of claim 13, further including instructions for: If there is no difference, then forwarding the input print job the to a PSP configured with the first print module or the second print module.

15. The computer of claim 13, further including instructions for: receiving the second print module from a provider; and notifying the provider of the difference.

16. The computer of claim 13, further including instructions for: receiving the input print job file from a user over a network; generating a soft proof file of the input print job file; and sending the soft proof file to the user over the network.

17. The computer of claim 13, wherein the input print job file comprises print objects of a print job and a description of how the print objects are to be processed.

18. The computer of claim 13, wherein the first print ready job file comprises rendered input print job which is ready to be sent for printing.

19. The computer of claim 13, wherein the print module controls scheduling processing and finishing of an input print job.

20. A non-transitory computer-readable medium having stored thereon instructions to be executed, the instructions, when executed by a processor, cause the processor to:
generate a first print ready job file by a first print module based on input print job file;
generate a second print ready job file by a second print module based on the input print job file;
using a print management module having a compare function to automatically compare differences of rendered objects between the first print ready job file and the second print ready job file; and
if there is at least one difference between the first print ready job file and the second print ready job file, using the print management module to forward the input print job file to a PSP (printer service provider) that is configured with the first print module or forward the second print ready job file to a PSP that is configured with the second print module, selecting one of the first print module and the second print module by ability to enforce result compatibility with an original soft proof file by an automatic proof enforcement.

21. The non-transitory computer-readable medium of claim 20, wherein the instructions, when executed by the process, cause the processor to: If there is no difference, then forward the input print job file to a PSP configured with the first print module or the second print module.

22. The non-transitory computer-readable medium of claim 20, wherein the instructions, when executed by the process, cause the processor to: receive the second print module from a provider; and notify the provider of the difference.

23. The non-transitory computer-readable medium of claim 20, wherein the instructions, when executed by the process, cause the processor to: receive the input print job file from a user over a network; generate a soft proof file of the input print job file; and send the soft proof file to the user over the network.

24. The non-transitory computer-readable medium of claim 20, wherein the input print job file comprises print objects of a print job and a description of how the print objects are to be processed.

25. The non-transitory computer-readable medium of claim 20, wherein the first print ready job file comprises a rendered input print job which is ready to be sent for printing.

* * * * *

UNITED STATES PATENT AND TRADEMARK OFFICE
CERTIFICATE OF CORRECTION

| | | |
|---|---|---|
| PATENT NO. | : 8,649,044 B2 | Page 1 of 1 |
| APPLICATION NO. | : 12/696192 | |
| DATED | : February 11, 2014 | |
| INVENTOR(S) | : Giannetti et al. | |

It is certified that error appears in the above-identified patent and that said Letters Patent is hereby corrected as shown below:

In the Claims

Column 9, line 40, in Claim 13, delete "odule" and insert -- module --, therefor.

Column 9, line 60, in Claim 14, delete "the" and insert -- file --, therefor.

Column 10, line 12, in Claim 18, after "comprises" insert -- a --.

Signed and Sealed this
Seventeenth Day of June, 2014

Michelle K. Lee
*Deputy Director of the United States Patent and Trademark Office*